US010228703B2

(12) United States Patent
Stathis et al.

(10) Patent No.: US 10,228,703 B2
(45) Date of Patent: Mar. 12, 2019

(54) TRAJECTORY-BASED SENSOR PLANNING

(71) Applicant: Sikorsky Aircraft Corporaton, Stratford, CT (US)

(72) Inventors: Christopher Stathis, Hamden, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/514,909

(22) PCT Filed: Nov. 11, 2015

(86) PCT No.: PCT/US2015/060162
§ 371 (c)(1),
(2) Date: Mar. 28, 2017

(87) PCT Pub. No.: WO2016/122744
PCT Pub. Date: Aug. 4, 2016

(65) Prior Publication Data
US 2017/0242445 A1    Aug. 24, 2017

Related U.S. Application Data

(60) Provisional application No. 62/077,987, filed on Nov. 11, 2014.

(51) Int. Cl.
*G05D 1/10*    (2006.01)
*G01S 13/88*   (2006.01)
(Continued)

(52) U.S. Cl.
CPC ............... *G05D 1/102* (2013.01); *B60R 1/12* (2013.01); *G01S 13/88* (2013.01); *G01S 17/88* (2013.01);
(Continued)

(58) Field of Classification Search
CPC .... G05D 1/102; G05D 1/0094; G08G 5/0021; G08G 5/0069; B60R 1/12; G01S 17/88; G01S 13/88
See application file for complete search history.

(56) References Cited

U.S. PATENT DOCUMENTS 6,421,081 B1    7/2002  Markus
6,422,508 B1    7/2002  Barnes
(Continued)

OTHER PUBLICATIONS

International Search Report and Written Opinion; International Application No. PCT/US2015/060162; Internation Filing Date: Nov. 11, 2015; dated Jul. 21, 2016; 18 Pages.
European Extended Search Report dated Sep. 26, 2018 cited in Application No. 15 880 621.6, 7 pgs.

*Primary Examiner* — Mussa A Shaawat
(74) *Attorney, Agent, or Firm* — Cantor Colburn LLP

(57) ABSTRACT

According to an aspect of the invention, a method of trajectory-based sensor planning for a vehicle includes receiving an indication of a planned change in a trajectory of the vehicle. A processing subsystem determines a current field of view of a directional sensor and a planned adjustment in the current field of view of the directional sensor relative to the vehicle to align with the planned change in the trajectory of the vehicle. The planned adjustment in the current field of view of the directional sensor is initiated prior to changing the trajectory of the vehicle.

20 Claims, 4 Drawing Sheets

(51) Int. Cl.
*G01S 17/88* (2006.01)
*G08G 5/00* (2006.01)
*G05D 1/00* (2006.01)
*B60R 1/12* (2006.01)

(52) U.S. Cl.
CPC ......... *G05D 1/0094* (2013.01); *G08G 5/0021* (2013.01); *G08G 5/0069* (2013.01)

(56) References Cited

U.S. PATENT DOCUMENTS

| | | |
|---|---|---|
| 7,040,772 B2 | 5/2006 | Perkes |
| 8,676,408 B2 | 3/2014 | Suzuki |
| 9,507,346 B1 * | 11/2016 | Levinson ............. G05D 1/0214 |
| 9,612,123 B1 * | 4/2017 | Levinson ............... G01C 21/32 |
| 2004/0212484 A1 | 10/2004 | Su et al. |
| 2007/0093945 A1 | 4/2007 | Grzywna et al. |
| 2012/0265380 A1 * | 10/2012 | Kuwata ............... G05D 1/0206 701/21 |
| 2013/0120578 A1 | 5/2013 | Iga et al. |
| 2014/0160276 A1 | 6/2014 | Pliefke et al. |
| 2014/0247352 A1 * | 9/2014 | Rathi ...................... B60R 1/00 348/148 |
| 2015/0323932 A1 * | 11/2015 | Paduano ................ G05D 1/042 701/3 |
| 2017/0248963 A1 * | 8/2017 | Levinson ............. G05D 1/0278 |
| 2017/0371355 A1 * | 12/2017 | Paduano ................ G05D 1/102 |
| 2018/0136651 A1 * | 5/2018 | Levinson ............. G05D 1/0044 |

* cited by examiner

TRAJECTORY-BASED SENSOR PLANNING

CROSS REFERENCE TO RELATED APPLICATIONS

This application is a National Stage application of PCT/US2015/060162, filed Nov. 11, 2015, which claims the benefit of U.S. Provisional Application No. 62/077,987, filed Nov. 11, 2014, both of which are incorporated by reference in their entirety herein.

BACKGROUND OF THE INVENTION

The subject matter disclosed herein generally relates to sensor data acquisition on a vehicle, and more particularly to trajectory-based sensor planning on a vehicle.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they typically use a perception system to identify obstacles that may impede safe travel. For directional sensors of a perception system that have a substantially limited field of view, a straight-ahead view typically spans large distances but peripheral perception can be poor. Inability to view laterally can limit the ability to navigate the vehicle autonomously in obstacle-rich environments, especially with aggressive flight paths that involve sharp turns. Additional sensors can be added to enhance a peripheral field of view, but this also adds weight and cost to the vehicle.

BRIEF DESCRIPTION OF THE INVENTION

According to an aspect of the invention, a method of trajectory-based sensor planning for a vehicle includes receiving an indication of a planned change in a trajectory of the vehicle. A processing subsystem determines a current field of view of a directional sensor and a planned adjustment in the current field of view of the directional sensor relative to the vehicle to align with the planned change in the trajectory of the vehicle. The planned adjustment in the current field of view of the directional sensor is initiated prior to changing the trajectory of the vehicle.

In addition to one or more of the features described above or below, or as an alternative, further embodiments could include where the indication of the planned change in the trajectory of the vehicle is from a path planner that generates a series of waypoints defining a series of expected vehicle locations at anticipated times.

In addition to one or more of the features described above or below, or as an alternative, further embodiments could include determining, by the processing subsystem, a desired field of view of the directional sensor relative to one or more of the waypoints; and computing the planned adjustment based on the desired field of view.

In addition to one or more of the features described above or below, or as an alternative, further embodiments could include comparing the planned change in the trajectory of the vehicle with the current field of view of the directional sensor, and determining the planned adjustment in the current field of view of the directional sensor based on a difference between the planned change in the trajectory of the vehicle and the current field of view of the directional sensor.

In addition to one or more of the features described above or below, or as an alternative, further embodiments could include changing a zoom setting of the directional sensor based on the planned change in the trajectory of the vehicle.

In addition to one or more of the features described above or below, or as an alternative, further embodiments could include where the current field of view of the directional sensor is adjusted by an actuation system. An actuator slew rate can be determined to reach a desired orientation of the directional sensor while keeping the current field of view of the directional sensor aligned with the planned change in the trajectory of the vehicle, and an actuation command can be output to the actuation system based on the actuator slew rate. In addition to one or more of the features described above or below, or as an alternative, further embodiments could include modifying the planned adjustment in the current field of view of the directional sensor based on detecting a change in a configuration setting of the directional sensor; and outputting a modified actuation command to the actuation system of the directional sensor based on modifying the planned adjustment in the current field of view of the directional sensor. In addition to one or more of the features described above or below, or as an alternative, further embodiments could include where the actuation command includes one or more of: an angular position and a slew command.

According to further aspects of the invention, a system is provided for trajectory-based sensor planning for a vehicle. The system includes a processing subsystem and memory having instructions stored thereon that, when executed by the processing subsystem, cause the system to receive an indication of a planned change in a trajectory of the vehicle. A current field of view of a directional sensor is determined. A planned adjustment in the current field of view of the directional sensor is determined relative to the vehicle to align with the planned change in the trajectory of the vehicle. The planned adjustment in the current field of view of the directional sensor is initiated prior to changing the trajectory of the vehicle.

In addition to one or more of the features described above or below, or as an alternative, further embodiments could include wherein the vehicle is an unmanned aerial vehicle, and the directional sensor and the system are onboard the unmanned aerial vehicle.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, trajectory-based sensor planning on a vehicle is provided to dynamically adjust a current field of view of one or more directional sensors based on an expected path of the vehicle. A directional sensor is sensor that has a field of view, such as a camera, as opposed to a non-directional sensor, such as a temperature sensor, a pressure sensor, and the like. Trajectory-based sensor planning may be implemented in whole or in part within autonomous aircraft, such as optionally-piloted vehicles (OPVs) and unmanned aerial vehicles (UAVs), and/or may be provided to assist a human-piloted aircraft. Furthermore, trajectory-based sensor planning can be implemented in any type of vehicle, including an aircraft, watercraft, spacecraft, or land vehicle. In exemplary embodiments, a current field of view of one or more directional sensors is adjusted according to a planned trajectory of the vehicle such that the current field of view of the one or more directional sensors is pointed in a direction that optimizes how much of the planned trajectory of the vehicle is observable. If the intended path includes a sharp turn, a sensor planner adjusts the current field of view of at least one of the directional sensors in the planned turn direction before the vehicle begins to turn. Thus, sharper vehicle turns at higher speeds may be performed without adding to the total number of sensors on the vehicle. The current field of view may be adjusted mechanically using an actuation system, electronically by altering a pattern of radiation, and/or using a zoom control to adjust an apparent angle of view/effective focal length.

Figure 1:
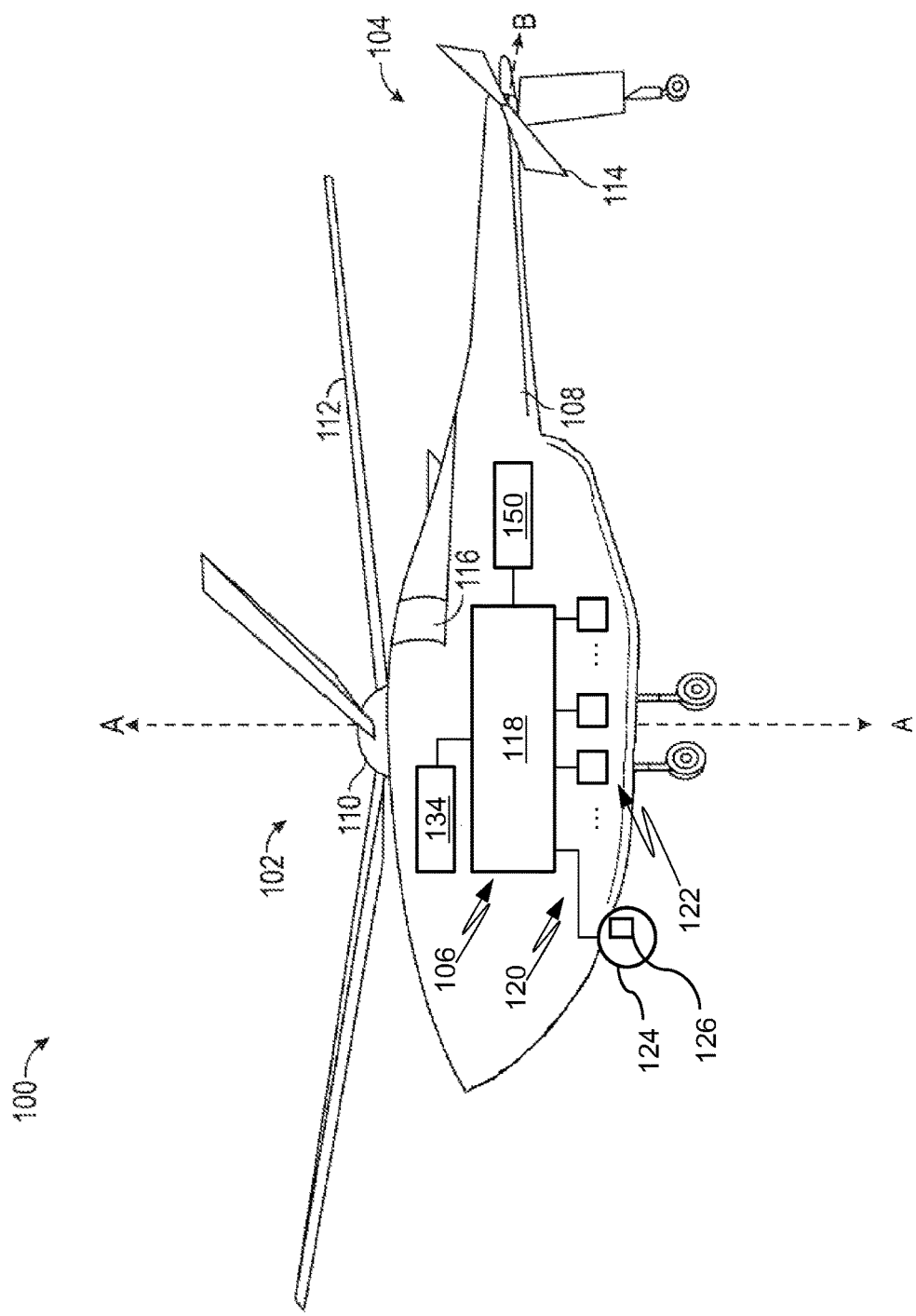
FIG. 1 is a perspective view of an exemplary rotary wing UAV aircraft according to an embodiment of the invention.

Referring now to the drawings, FIG. 1 illustrates a perspective view of an exemplary vehicle in the form of an autonomous rotary-wing unmanned aerial vehicle (UAV) 100 (also referred to as "autonomous UAV 100" or "aircraft 100") for implementing trajectory-based sensor planning according to an embodiment of the invention. As illustrated, the autonomous UAV 100 is an aircraft that includes a main rotor system 102, an anti-torque system, for example, a tail rotor system 104, and a planning system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed.

The planning system 106 includes a vehicle computer system 118 having one or more processing resources and memory to process sensor data acquired from a sensing system 120. The sensing system 120 may be attached to or incorporated within the airframe 108. The sensing system 120 includes one or more fixed sensors 122 and at least one directional sensor 124. An actuation system 126 can be used to change a position and/or orientation of the at least one directional sensor 124 in embodiments that are physically adjusted. For a directional sensor 124 that is electronically aimed, such as phased array radar, the actuation system 126 can be omitted. For example, phased array radar can electrically vary an effective radiation pattern such that radiation is reinforced in a desired direction and suppressed in undesired directions without mechanical actuation. The vehicle computer system 118 processes, in one non-limiting embodiment, raw data acquired through the sensing system 120 while the autonomous UAV 100 is airborne.

In an embodiment, the directional sensor 124 may be one or more of: a LIDAR scanner, a video camera, a multi-spectral camera, a stereo camera system, a structure light-based 3D/depth sensor, a time-of-flight camera, a LADAR scanner, a RADAR scanner, a phased array sensor, or the like in order to capture sensor data within a field of view to assist in vehicle navigation. Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance positional awareness of the autonomous UAV 100. The navigation system 134 in combination with the sensor data may be used to determine path plans for a trajectory of the autonomous UAV 100. Sensor data from the sensing system 120 may also be relayed to other vehicles or control stations (not depicted) via a communication interface 150.

Figure 2:
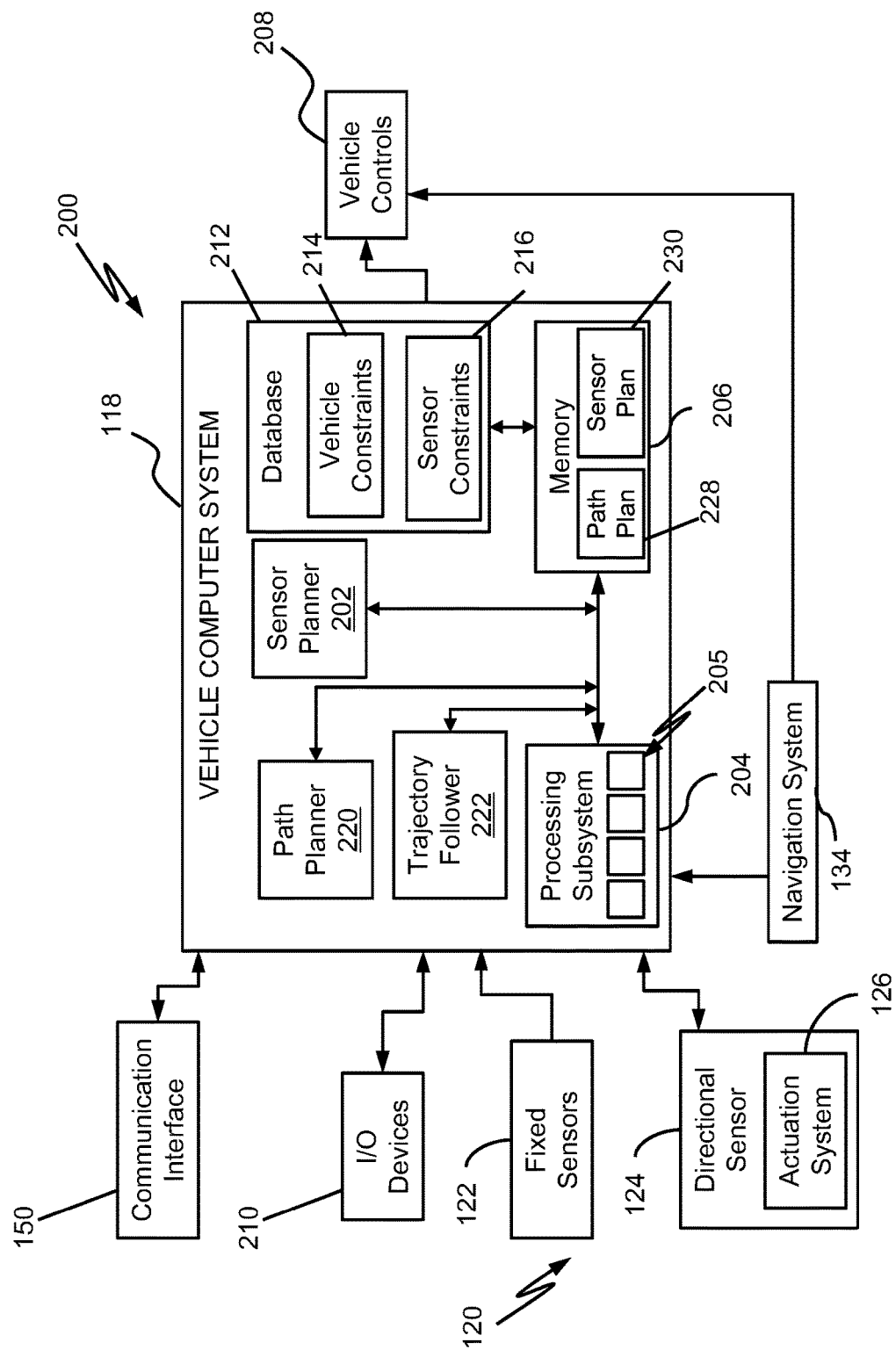
FIG. 2 is a schematic view of an exemplary computing system according to an embodiment of the invention.

FIG. 2 illustrates a schematic block diagram of a system 200 for trajectory-based sensor planning onboard the autonomous UAV 100 of FIG. 1 according to an exemplary embodiment. The system 200 is an embodiment of the planning system 106 of FIG. 1. As illustrated, the system 200 includes the vehicle computer system 118 that executes instructions for implementing a sensor planner 202. The vehicle computer system 118 may also execute instructions for implementing a path planner 220 and a trajectory follower 222, as well as other functions (not depicted). The vehicle computer system 118 receives sensor data indicative of current conditions using the sensing system 120, including one or more fixed sensors 122 and at least one directional sensor 124 that may include the actuation system 126. As depicted in FIG. 2, the vehicle computer system 118 includes a memory 206 that communicates with a processing subsystem 204. The memory 206 may store the sensor planner 202, path planner 220 and/or trajectory follower 222 as executable instructions that are executed by the processing subsystem 204. The memory 206 is an example of a non-transitory computer readable storage medium tangibly embodied in the vehicle computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. Accordingly, the memory 206 may also hold various data values, such as a path plan 228, a sensor plan 230, and/or other values to support vehicle trajectory and sensor planning. The path plan 228 can be received and stored in the memory 206 as created locally by the path planner 220 or received remotely via the communication interface 150. The sensor planner 202 can create the sensor plan 230 in view of the path plan 228 with respect to vehicle constraints 214 and sensor constraints 216.

The processing subsystem 204 may include any number and type of processors, including a general purpose processor, a digital signal processor, a microcontroller, an application specific integrated circuit, a field programmable gate array, or the like. In an exemplary embodiment, the processing subsystem 204 includes a plurality of processing resources 205, which may be separate cores, processing circuits, and/or processors supporting parallel computing. Although depicted as singular blocks, the processing subsystem 204 and memory 206 can be distributed between multiple processing circuits and memory subsystems. In an embodiment, the processing subsystem 204 performs additional processing tasks for the system 200.

The system 200 may include a database 212 to store a variety of values, such as the vehicle constraints 214, the sensor constraints 216, and the like. The vehicle constraints 214 may define a variety of limits associated with flight dynamics and limits of maneuverability of the autonomous UAV 100 of FIG. 1. The sensor constraints 216 can define features such as a field of view and a zoom capability of directional sensor 124, as well as positional and rate of change constraints for the actuation system 126. For example, the directional sensor 124 may support a scanning mode between a pair of angular positions as endpoints defined relative to a reference frame of the autonomous UAV 100 of FIG. 1, where a scan rate between the endpoints is defined as an actuator slew rate for the actuation system 126.

The system 200 may provide one or more controls, such as vehicle controls 208. The vehicle controls 208 may provide directives based on, e.g., data associated with the navigation system 134. Trajectory follower 222 can interface with the navigation system 134 and the path plan 228 to provide higher-level directives to the vehicle controls 208 that are translated into lower-level directives for engine controls, rotor controls, and the like. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust the constraints 214, 216 and relationships between the path plan 228 and sensor plan 230. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processing subsystem 204.

Figure 3B:
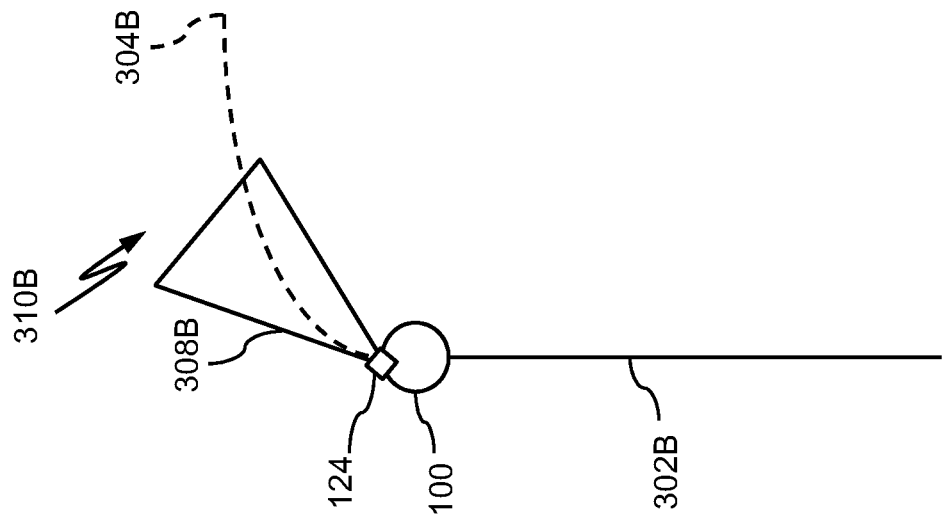
FIGS. 3A and 3B illustrate a planned change in a trajectory of a vehicle and a planned adjustment in a current field of view of a directional sensor according to an embodiment of the invention.
Figure 3A:
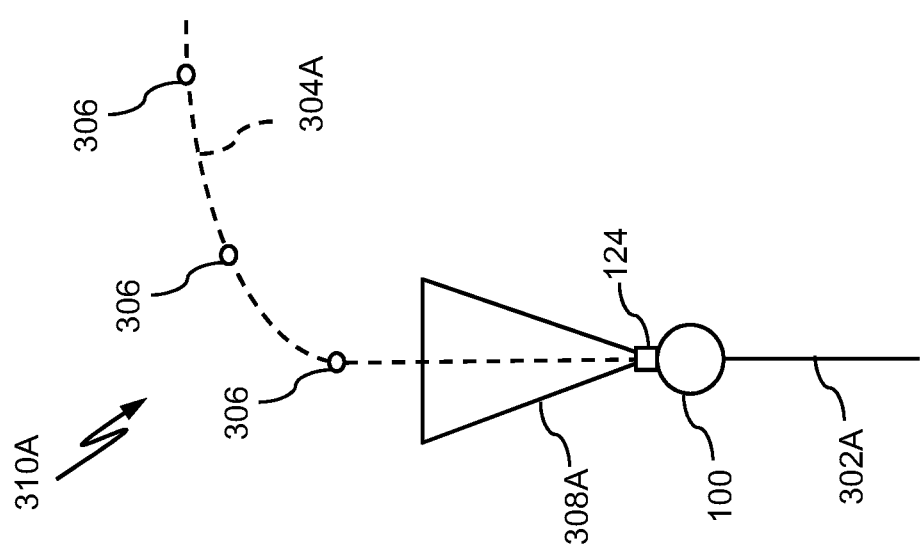

FIGS. 3A and 3B illustrate a planned change in a trajectory of a vehicle and a planned adjustment in a current field of view of a directional sensor according to an embodiment. In FIG. 3A, the autonomous UAV 100 has a current trajectory 302A and a planned trajectory 304A based on the path plan 228 of FIG. 2. For example, a series of waypoints 306 can be generated by the path planner 220 of FIG. 2 in the path plan 228 of FIG. 2 to define a series of expected vehicle locations at anticipated times from which the planned trajectory 304A can be derived. The directional sensor 124 has a current field of view 308A that can be defined based on the sensor constraints 216 of FIG. 2, current positioning of the actuation system 126 of FIG. 2 (if applicable), a zoom level, and other known current sensor configuration information. In an exemplary embodiment, the sensor planner 202 of FIG. 2 seeks to keep the current field of view 308A substantially aligned with the planned trajectory 304A prior to a change in trajectory 310A of the autonomous UAV 100. The planned trajectory 304A may be an extension of the current trajectory 302A but can also include a change in trajectory 310A, such as a turn.

As depicted in FIG. 3B, the autonomous UAV 100 advances along current trajectory 302B towards a planned trajectory 304B that includes a change in trajectory 310B. As the autonomous UAV 100 approaches the change in trajectory 310B, the directional sensor 124 is adjusted such that current field of view 308B substantially aligns with the planned trajectory 304B even before the autonomous UAV 100 reaches the change in trajectory 310B.

Figure 4:
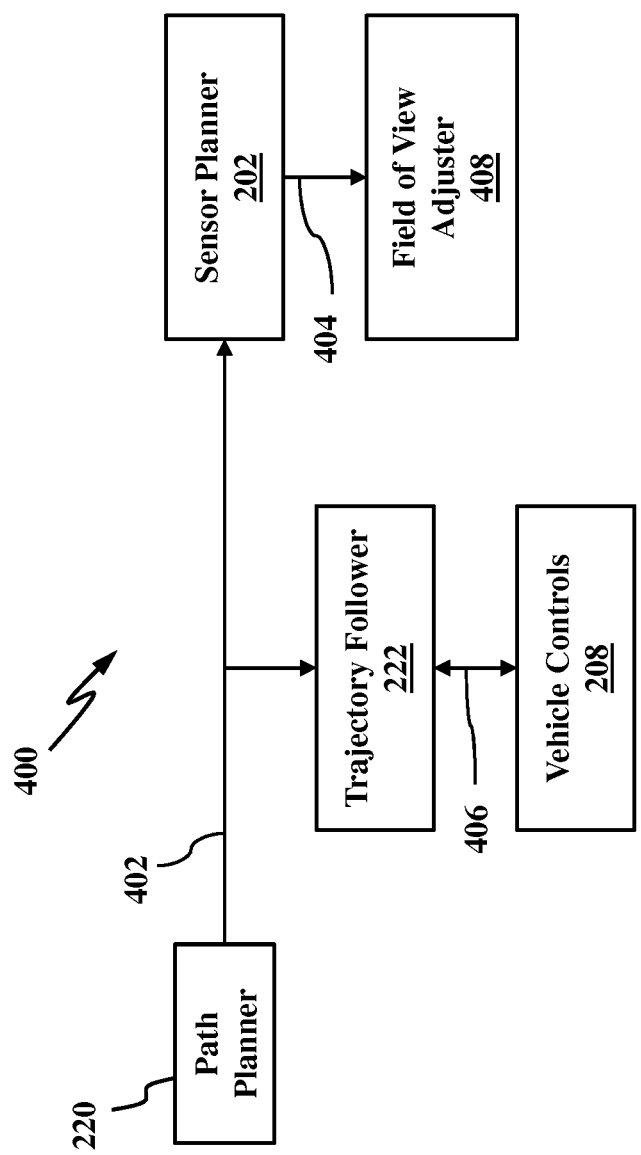
FIG. 4 illustrates a dataflow diagram for trajectory-based sensor planning on a vehicle according to an embodiment of the invention.

FIG. 4 illustrates an exemplary data flow diagram 400 that can be performed by the processing subsystem 204 of FIG. 2 in combination with one or more other controls or systems with continued reference to FIGS. 1-3B. As depicted in FIG. 4, the path planner 220 can dynamically generate a planned trajectory 402 for the autonomous UAV 100 of FIG. 1 that is provided to the sensor planner 202 and trajectory follower 222. The sensor planner 202 can in turn provide one or more commands 404 to a field of view adjuster 408 to align a current field of view of the directional sensor 124 of FIG. 1 with a planned change in the trajectory of the autonomous UAV 100 of FIG. 1. Where the actuation system 126 of FIG. 1 is used as the field of view adjuster 408 to physically reposition and/or reorient the directional sensor 124, the one or more commands 404 can be actuation commands. The field of view adjuster 408 may also or alternatively include an electronic aiming control to electronically redirect the directional sensor 124. Additionally, the field of view adjuster 408 may also or alternatively include a zoom control to adjust an apparent angle of view/effective focal length of the directional sensor 124.

The trajectory follower 222 can implement a control loop 406 with respect to the vehicle controls 208 to follow the planned trajectory 402. The planned trajectory 304A and 304B of FIGS. 3A and 3B are examples of the planned trajectory 402.

In an embodiment, the sensor planner 202 receives an indication of a planned change in a trajectory of the autonomous UAV 100 of FIG. 1, for instance, by comparing a current trajectory (e.g., current trajectory 302A, 302B of FIGS. 3A and 3B) of the autonomous UAV 100 of FIG. 1 with the planned trajectory 402. The indication of the planned change in the trajectory of the autonomous UAV 100 of FIG. 1 may be received from the path planner 220 that generates a series of waypoints 306 of FIG. 3A defining a series of expected vehicle locations at anticipated times. The sensor planner 202 can determine a planned adjustment in a current field of view (e.g., changing from current field of view 308A to 308B in FIGS. 3A and 3B) of the directional sensor 124 of FIG. 1 relative to the autonomous UAV 100 of FIG. 1 to align with the planned change in the trajectory of the autonomous UAV 100. For example, the processing subsystem 204 of FIG. 2 can determine a desired field of view of the directional sensor 124 relative to one or more of the waypoints 306 of FIG. 3A.

When the actuation system 126 is used, an actuation command can be computed based on a desired orientation of the directional sensor 124. Computing of the actuation command can further include determining an actuator slew rate to reach the desired orientation of the directional sensor 124 while keeping the current field of view 308B of FIG. 3B of the directional sensor 124 aligned with the planned change in the trajectory 310B of FIG. 3B of the autonomous UAV 100 along the planned trajectory 304B of FIG. 3B. A current field of view 308A of FIG. 3A of the directional sensor 124 can be determined based on the sensor constraints 216 of FIG. 2, current positioning of the actuation system 126, and configurable settings, such as a zoom level. Determining the actuation command can also include comparing the planned change in the trajectory 310A of the autonomous UAV 100 with the current field of view 308A of FIG. 3A of the directional sensor 124. The planned adjustment in the current field of view (e.g., to current field of view 308B of FIG. 3B) of the directional sensor 124 may be determined based on a difference between the planned change in the trajectory 310A of FIG. 3A of the autonomous UAV 100 and the current field of view 308A of the directional sensor 124. A zoom setting of the directional sensor 124 may also be changed based on the planned change in the trajectory 310A of the autonomous UAV 100, e.g., to widen/shorten or narrow/lengthen the current field of view 308B of FIG. 3B.

The vehicle computer system 118 of FIG. 1 can output a command 404 as an actuation command from the sensor planner 202 to the actuation system 126 of the directional sensor 124 of FIG. 1 to perform a planned adjustment in positioning of the directional sensor 124 prior to changing the trajectory of the autonomous UAV 100. The actuation command may include an angular position and/or a slew command.

As the autonomous UAV 100 advances, the vehicle computer system 118 of FIG. 1 can continue monitoring conditions associated with the autonomous UAV 100, any overriding commands, newly detected obstacles, environmental conditions, and the like. As one example, a manual override of the directional sensor 124 may alter a configuration setting of the directional sensor 124, for instance where a remotely located operator desires to use the directional sensor 124 to focus on a particular obstacle or other feature of interest. This change may be reflected as a change in a configuration setting of the directional sensor 124, which can result in a different starting position or zoom level than initially planned once the manual override of the directional sensor 124 is released. In an embodiment, the planned adjustment in positioning of the directional sensor 124 can be modified based on detecting a change in a configuration setting of the directional sensor 124. A modified actuation command can be output to the actuation system 126 of the directional sensor 124 as the actuation command based on modifying the planned adjustment in positioning of the directional sensor 124. For instance, a faster slew rate may need to be applied to the actuation system 126 in order to compensate for a deviation from a previously planned adjustment.

Technical effects include performing trajectory-based sensor planning for a vehicle. The trajectory-based sensor planning can be used to adjust a current field of view of one or more sensors in anticipation of a change in trajectory of the vehicle, which can give the vehicle operator or control system a greater amount of observation and reaction time.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of trajectory-based sensor planning for a vehicle, the method comprising:
receiving an indication of a planned change in a trajectory of the vehicle;
determining, by a processing subsystem, a current field of view of a directional sensor, wherein the current field of view of the directional sensor is determined based on sensor constraints, a current positioning of an actuation system, a zoom level, and sensor configuration information associated with the directional sensor;
determining, by the processing subsystem, a planned adjustment in the current field of view of the directional sensor relative to the vehicle to align with the planned change in the trajectory of the vehicle; and
initiating the planned adjustment in the current field of view of the directional sensor prior to changing the trajectory of the vehicle.

2. The method of claim 1, wherein the indication of the planned change in the trajectory of the vehicle is from a path planner that generates a series of waypoints defining a series of expected vehicle locations at anticipated times.

3. The method of claim 2, further comprising:
determining, by the processing subsystem, a desired field of view of the directional sensor relative to one or more of the waypoints; and
computing the planned adjustment based on the desired field of view.

4. The method of claim 1, further comprising:
comparing the planned change in the trajectory of the vehicle with the current field of view of the directional sensor; and
determining the planned adjustment in the current field of view of the directional sensor based on a difference between the planned change in the trajectory of the vehicle and the current field of view of the directional sensor.

5. The method of claim 1, further comprising:
changing a zoom setting of the directional sensor based on the planned change in the trajectory of the vehicle.

6. The method of claim 1, wherein the current field of view of the directional sensor is adjusted by an actuation system, and further comprising:
determining an actuator slew rate to reach a desired orientation of the directional sensor while keeping the current field of view of the directional sensor aligned with the planned change in the trajectory of the vehicle; and
outputting an actuation command to the actuation system based on the actuator slew rate.

7. The method of claim 6, further comprising:
modifying the planned adjustment in the current field of view of the directional sensor based on detecting a change in a configuration setting of the directional sensor; and
outputting a modified actuation command to the actuation system of the directional sensor based on modifying the planned adjustment in the current field of view of the directional sensor.

8. The method of claim 6, wherein the actuation command comprises one or more of: an angular position and a slew command.

9. A system for trajectory-based sensor planning for a vehicle, the system comprising:
a processing subsystem; and
memory having instructions stored thereon that, when executed by the processing subsystem, cause the system to:
receive an indication of a planned change in a trajectory of the vehicle;

determine a current field of view of a directional sensor, wherein the current field of view of the directional sensor is determined based on sensor constraints, a current positioning of an actuation system, a zoom level, and sensor configuration information associated with the directional sensor;

determine a planned adjustment in the current field of view of the directional sensor relative to the vehicle to align with the planned change in the trajectory of the vehicle; and initiating the planned adjustment in the current field of view of the directional sensor prior to changing the trajectory of the vehicle.

10. The system of claim 9, wherein the indication of the planned change in the trajectory of the vehicle is from a path planner that generates a series of waypoints defining a series of expected vehicle locations at anticipated times, and the instructions when executed by the processing subsystem, further cause the system to:

determine a desired field of view of the directional sensor relative to one or more of the waypoints; and compute the planned adjustment based on the desired field of view.

11. The system of claim 9, wherein the instructions when executed by the processing subsystem, further cause the system to:

compare the planned change in the trajectory of the vehicle with the current field of view of the directional sensor; and determine the planned adjustment in the current field of view of the directional sensor based on a difference between the planned change in the trajectory of the vehicle and the current field of view of the directional sensor.

12. The system of claim 9, wherein the instructions when executed by the processing subsystem, further cause the system to change a zoom setting of the directional sensor based on the planned change in the trajectory of the vehicle.

13. The system of claim 9, wherein the current field of view of the directional sensor is adjusted by an actuation system and the instructions when executed by the processing subsystem, further cause the system to:

determine an actuator slew rate to reach a desired orientation of the directional sensor while keeping the current field of view of the directional sensor aligned with the planned change in the trajectory of the vehicle; and output an actuation command to the actuation system based on the actuator slew rate.

14. The system of claim 13, wherein the instructions when executed by the processing subsystem, further cause the system to:

modify the planned adjustment in the current field of view of the directional sensor based on a detected change in a configuration setting of the directional sensor; and output a modified actuation command to the actuation system of the directional sensor based on a modification of the planned adjustment in the current field of view of the directional sensor.

15. The system of claim 9, wherein the vehicle is an unmanned aerial vehicle, and the directional sensor and the system are onboard the unmanned aerial vehicle.

16. The system of claim 9, wherein the sensor constraints define features associated with at least one of: a field of view, a zoom capability of the directional sensor and positional and rate of change constraints for the actuation system.

17. The system of claim 9, wherein the directional sensor support a scanning mode between a pair of angular positions as endpoints defined relative to a reference frame of an autonomous unmanned aerial vehicle.

18. The system of claim 9, wherein the processing subsystem further causes the system to create a sensor plan in view of a path plan with respect to vehicle constraints and sensor constraints.

19. The method of claim 1, wherein the sensor constraints define features associated with at least one of: a field of view, a zoom capability of the directional sensor and positional and rate of change constraints for the actuation system.

20. The method of claim 1, further comprising creating a sensor plan in view of a path plan with respect to vehicle constraints and sensor constraints.

* * * * *